(12) United States Patent
Finkelstein et al.

(10) Patent No.: US 12,504,519 B2
(45) Date of Patent: Dec. 23, 2025

(54) POWER-EFFICIENT DIRECT TIME OF FLIGHT LIDAR

(71) Applicant: Sense Photonics, Inc., Durham, NC (US)

(72) Inventors: Hod Finkelstein, Berkeley, CA (US); Tarek Al Abbas, Edinburgh (GB)

(73) Assignee: Sense Photonics, Inc., Durham, NC (US)

( * ) Notice: Subject to any disclaimer, the term of this patent is extended or adjusted under 35 U.S.C. 154(b) by 1122 days.

(21) Appl. No.: 17/487,549

(22) Filed: Sep. 28, 2021

(65) Prior Publication Data

US 2022/0099814 A1    Mar. 31, 2022

Related U.S. Application Data

(60) Provisional application No. 63/085,854, filed on Sep. 30, 2020.

(51) Int. Cl.
| | |
|---|---|
| *G01S 7/4863* | (2020.01) |
| *G01S 7/481* | (2006.01) |
| *G01S 7/484* | (2006.01) |
| *G01S 7/486* | (2020.01) |
| *G01S 7/4865* | (2020.01) |
| *G01S 17/931* | (2020.01) |

(52) U.S. Cl.
CPC .......... *G01S 7/4863* (2013.01); *G01S 7/4815* (2013.01); *G01S 7/484* (2013.01); *G01S 7/486* (2013.01); *G01S 7/4865* (2013.01); *G01S 17/931* (2020.01)

(58) Field of Classification Search
CPC ....... G01S 7/484; G01S 7/4815; G01S 7/4863
USPC ............................................................ 356/4
See application file for complete search history.

(56) References Cited

U.S. PATENT DOCUMENTS

| | | | | |
|---|---|---|---|---|
| 9,417,326 | B2 * | 8/2016 | Niclass | G01S 7/4814 |
| 10,983,197 | B1 * | 4/2021 | Zhu | G01S 7/4816 |
| 11,275,155 | B1 * | 3/2022 | Phillips | G01S 7/4816 |
| 2018/0301872 | A1 | 10/2018 | Burroughs et al. | |
| 2019/0250257 | A1 | 8/2019 | Finkelstein et al. | |
| 2020/0141716 | A1 * | 5/2020 | Droz | G01S 7/4863 |
| 2020/0158836 | A1 | 5/2020 | Henderson et al. | |
| 2020/0233068 | A1 | 7/2020 | Henderson et al. | |
| 2020/0256669 | A1 | 8/2020 | Roth et al. | |
| 2020/0256993 | A1 * | 8/2020 | Oggier | H01S 5/183 |
| 2021/0055391 | A1 * | 2/2021 | LaChapelle | G01S 7/4917 |
| 2021/0109224 | A1 | 4/2021 | Finkelstein et al. | |
| 2021/0215807 | A1 | 7/2021 | Henderson et al. | |
| 2021/0231782 | A1 | 7/2021 | Henderson et al. | |
| 2021/0302550 | A1 * | 9/2021 | Dutton | G01S 17/894 |
| 2021/0389462 | A1 * | 12/2021 | Wang | G01S 17/89 |

(Continued)

*Primary Examiner* — Robert W Hodge
*Assistant Examiner* — Kara M. Richter
(74) *Attorney, Agent, or Firm* — Kilpatrick Townsend & Stockton LLP

(57) ABSTRACT

A Light Detection and Ranging (LIDAR) system includes a light source configured to emit a plurality of light beams having respective divergence angles over respective fields of illumination, and a detector array comprising plurality of detector pixels having respective fields of detection and configured to output respective detection signals responsive to light incident thereon. The respective fields of detection of the detector pixels are greater than or equal to the respective divergence angles of the light beams. Related devices and methods are also discussed.

20 Claims, 6 Drawing Sheets

(56) References Cited

U.S. PATENT DOCUMENTS

2022/0091239 A1\* 3/2022 Bolatkale ................ G01S 7/487
2022/0171031 A1\* 6/2022 Goren ................... G01S 7/4817

\* cited by examiner

POWER-EFFICIENT DIRECT TIME OF FLIGHT LIDAR

CLAIM OF PRIORITY

This application claims priority from U.S. Provisional Patent Application Ser. No. 63/085,854, filed Sep. 30, 2020, the disclosure of which is incorporated by reference herein in its entirety.

FIELD

The present disclosure relates to LIght Detection And Ranging (LIDAR; also referred to herein as lidar) systems and related methods of operation.

BACKGROUND

Time of flight (ToF)-based imaging is used in a number of applications including range finding, depth profiling, and 3D imaging (e.g., lidar). Direct time of flight measurement includes directly measuring the length of time between emitting radiation by emitter element(s) of the lidar system and sensing the radiation at detector element(s) of the lidar system after reflection from an object or other target, where the reflected radiation may be referred to as an "echo" signal. From this length of time, the distance to the target can be determined. Indirect time of flight measurement includes determining the distance to the target by phase modulating the amplitude of the signals emitted by emitter element(s) of the lidar system and measuring phases (e.g., with respect to delay or shift) of the echo signals received at detector element(s) of the lidar system. These phases may be measured with a series of separate measurements or samples.

In specific applications, the sensing of the reflected radiation in either direct or indirect time of flight systems may be performed using an array of photodetectors, such as an array of Single Photon Avalanche Diodes (SPADs). A SPAD is based on a semiconductor junction (e.g., a p-n junction) that may detect incident photons when biased beyond its breakdown region, for example, by or in response to a strobe signal having a desired pulse width (also referred to herein as "strobing"). The high reverse bias voltage generates a sufficient magnitude of electric field such that a single charge carrier introduced into the depletion layer of the device can cause a self-sustaining avalanche via impact ionization. Once the avalanche occurs, the SPAD may be unable to detect additional photons (e.g., the SPAD may experience a "dead" time). The avalanche is quenched by a quench circuit, either actively (e.g., by reducing the bias voltage) or passively (e.g., by using the voltage drop across a serially connected resistor), to allow the device to be "reset" to detect further photons. The initiating charge carrier can be photo-electrically generated by means of a single incident photon striking the high field region. One or more photodetectors may define a detector pixel of the array. SPAD arrays may be used as solid-state detectors in imaging applications where high sensitivity and timing resolution may be required.

In some conventional configurations, a SPAD in an array may be strobed by pre-charging the SPAD beyond its breakdown voltage at a time correlated with the firing of an emitter pulse. If a photon is absorbed in the SPAD, it may trigger an avalanche breakdown. This event can trigger a time measurement in a time-to-digital converter (TDC), which in turn can output a digital value corresponding to the arrival time of the detected photon. Some ToF pixel approaches may use digital or analog circuits to count the detection of photons and the arrival times of photons, also referred to as time-stamping. A single arrival time carries little information because avalanches may be triggered by ambient light, by thermal emissions within the diode, by a trapped charge being released (afterpulse), and/or via tunneling. Moreover, SPAD devices may have an inherent jitter in their response. Statistical digital processing is typically performed in 3D SPAD-based direct TOF imagers.

It may be desirable to reduce or minimize the power consumption of lidar systems for ease of integration, for example in vehicles, as well as to reduce cost. Flash lidar systems can illuminate up to the entire field of view simultaneously, and thus may be less susceptible to motion artifacts and may require only rudimentary calibration between the light source (e.g., one or more optical emitter element(s), also referred to herein as emitters) and the light receiver (e.g., one or more optical detector element(s), also referred to herein as detectors). Some emitters utilize diffuse illumination to generate high resolution 3D point clouds.

Some lidar systems may include an array of single photon avalanche detectors (SPADs) used to measure the time-of-flight of photons generated by an emitter and reflected from one or more targets (referred to herein as signal photons) over a field of view (FoV). The output of the SPAD array may be imaged using an array of TDCs. As TDCs may occupy a relatively large area and consume a relatively high amount of power, some lidar systems may be operated such that only a small percentage or subset of the pixels (each defined by a respective SPAD) may detect a signal at a given time. A control circuit may identify and process only the outputs of the subset of the pixels or SPADs that have detected signal photons. Thus, a TDC may be shared between multiple pixels (collectively called a "super-pixel") and a smaller total number of TDCs may be used to undersample a wide field of view.

SUMMARY

Some embodiments described herein provide a lidar system including one or more light emitter units (including one or more semiconductor lasers, such as surface- or edge-emitting laser diodes; generally referred to herein as emitters, which output respective light signals), one or more light detector pixels (including one or more photodetectors, such as semiconductor photodiodes, including avalanche photodiodes and single-photon avalanche detectors; generally referred to herein as detectors, which output respective detection signals in response to incident light), and one or more control circuits that are configured to operate subsets of the emitter units and/or detector pixels (including respective emitters and/or detectors thereof) to emit and detect light over a field of view (FoV; which may include the field of illumination of the emitters and/or the field of detection of the detectors) to provide a 3D time of flight (ToF) flash lidar system.

According to some embodiments of the present disclosure, a Light Detection and Ranging (LIDAR) system may include an emitter array including a plurality of emitter units, each of the emitter units being configured to emit light with a respective divergence angle over a respective field of illumination, and a detector array including plurality of detector pixels, each of the detector pixels having a respective field of detection. The emitter array is configured to emit a plurality of beams of light (e.g., defining a sparse array of beams of pulsed light which may be collimated in some instances) with a predetermined pitch between beams, also referred to herein as a structured illumination pattern. The respective field of detection of each of the detector pixels is greater than or equal to the divergence angle of the beams of light, but is smaller than the predetermined pitch between the beams of light.

In some embodiments of the present disclosure, a Light Detection and Ranging (LIDAR) system includes a light source configured to emit a plurality of light beams having respective divergence angles over respective fields of illumination, and a detector array comprising plurality of detector pixels having respective fields of detection and configured to output respective detection signals responsive to light incident thereon. The respective fields of detection of the detector pixels are greater than or equal to the respective divergence angles of the light beams. In some embodiments, the respective fields of illumination define a structured illumination pattern having a predetermined pitch between adjacent ones of the light beams, and wherein the respective fields of detection are less than the predetermined pitch.

In some embodiments, the respective divergence angles of the light beams may be less than the predetermined pitch between adjacent ones of the light beams.

In some embodiments, the respective fields of illumination may define a sparse pattern of illumination. The respective fields of illumination of the sparse pattern of illumination may be less than about one-third of the respective fields of detection of the detector pixels.

In some embodiments, the respective fields of detection of the detector pixels may be less than about 1 degree by 1 degree. For example, the respective fields of detection of the detector pixels may be about 0.5 degrees by 0.5 degrees.

In some embodiments, the respective divergence angles may be less than about 0.5 degrees by 0.5 degrees. For example, the respective divergence angles may be about 0.1 degrees by 0.1 degrees.

In some embodiments, a predetermined pitch between adjacent ones of the light beams may be less than about 5 degrees by 5 degrees. For example, the predetermined pitch between adjacent ones of the light beams may be about 1 degree by 1 degree.

In some embodiments, the respective detection signals may indicate detection of photons corresponding to the light beams and/or ambient light. At least one control circuit may be configured to process the respective detection signals output from the plurality of the detector pixels to determine respective arrival times of the photons corresponding to the light beams.

In some embodiments, the at least one control circuit may be configured to determine the respective arrival times without performing one or more time-to-digital conversion operations.

In some embodiments, the LIDAR system may further include a memory device comprising a non-transitory storage medium configured to store data in respective memory bins corresponding to respective times-of-arrival. The at least one control circuit may be configured to update the data in the respective memory bins responsive to the respective detection signals from the plurality of the detector pixels.

In some embodiments, the at least one control circuit may be configured to update the data in the respective memory bins of respective memory arrays corresponding to respective ones of the detector pixels, and determine the respective arrival times based on readout signals from the respective memory arrays.

In some embodiments, the readout signals from the respective memory arrays may represent respective histograms of the data collected by the respective ones of the detector pixels, and the at least one control circuit may be configured to detect peaks in the respective histograms to determine the respective arrival times of the photons corresponding to the light beams.

In some embodiments, the at least one control circuit may be configured to determine respective arrival times of the photons corresponding to the light beams based on a time correlation indicated by the readout signals.

In some embodiments, the light source may include one or more vertical cavity surface emitting lasers (VCSELs).

In some embodiments, the detector pixels may respectively include one or more single photon avalanche diodes (SPADs).

In some embodiments, the LIDAR system may be configured to be coupled to an autonomous vehicle such that the light source and the detector array are oriented to face an intended direction of travel of the autonomous vehicle.

In some embodiments of the present disclosure, a method of fabricating a Light Detection and Ranging (LIDAR) system includes providing a light source configured to emit a plurality of light beams having respective divergence angles over respective fields of illumination, and providing a detector array comprising plurality of detector pixels having respective fields of detection and configured to output respective detection signals responsive to light incident thereon. The respective fields of detection of the detector pixels are greater than or equal to the respective divergence angles of the light beams.

In some embodiments, the respective fields of illumination may define a structured illumination pattern having a predetermined pitch between adjacent ones of the light beams, and the respective fields of detection may be less than the predetermined pitch.

In some embodiments, the respective divergence angles of the light beams may be less than the predetermined pitch between adjacent ones of the light beams.

In some embodiments, the respective fields of illumination may define a sparse pattern of illumination. The respective fields of illumination of the sparse pattern of illumination may be less than about one-third of the respective fields of detection of the detector pixels.

In some embodiments, the respective detection signals may indicate detection of photons corresponding to the light beams and/or ambient light, and at least one control circuit may be provided to process the respective detection signals output from the plurality of the detector pixels to determine respective arrival times of the photons corresponding to the light beams.

In some embodiments of the present disclosure, a Light Detection and Ranging (LIDAR) detector circuit includes a detector array comprising single photon avalanche diodes (SPADs) defining plurality of detector pixels having respective fields of detection and configured to output respective detection signals responsive to light incident thereon. The respective fields of detection of the detector pixels are greater than or equal to respective divergence angles of light beams output from a LIDAR light source comprising one or more vertical cavity surface emitting lasers (VCSELs), and are less than a predetermined pitch between adjacent ones of the light beams.

More generally, in some embodiments of the present disclosure, the emitter units and/or the detector pixels may be configured relative to one another such that the respective fields of illumination of the emitter units (including the divergence angle and pitch of the beams of light emitted therefrom) define a relatively sparse pattern of illumination (e.g., less than about one-half, less than about one-third, or less than about one-fifth of) in comparison to the respective fields of detection of the detector pixels, or otherwise so as to reduce the probability of illumination of more than one of the detector pixels by an echo signal corresponding to the beams of light. In some embodiments, the respective field of detection of each of the detector pixels is greater than the respective divergence angles of the beams of light output from the emitter units, but is smaller than the predetermined pitch between the beams of light, such that the probability of illumination of more than one of the detector pixels by an echo signal corresponding to the beams of light decreases as the divergence angle of the beams of light narrows.

Optical power requirements of embodiments of the present disclosure may thereby be significantly reduced. Also, by activating a plurality of or all detector pixels and outputting time-of-arrival histograms for the respective detector pixels (rather than first identifying which detector pixels received signal photons and only then measuring times-of-arrival for those detector pixels via TDCs), embodiments of the present disclosure can provide faster throughput in real time with reduced processing requirements.

Some embodiments described herein can determine which detector pixels detect signal returns and disable one or more detector pixels that do not detect signal returns, to reduce power and crosstalk. Some embodiments described herein may not be substantially affected by motion between receiver and emitter, as the receiver and the emitter may not be co-registered (e.g., spatially).

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION

Figure 1:
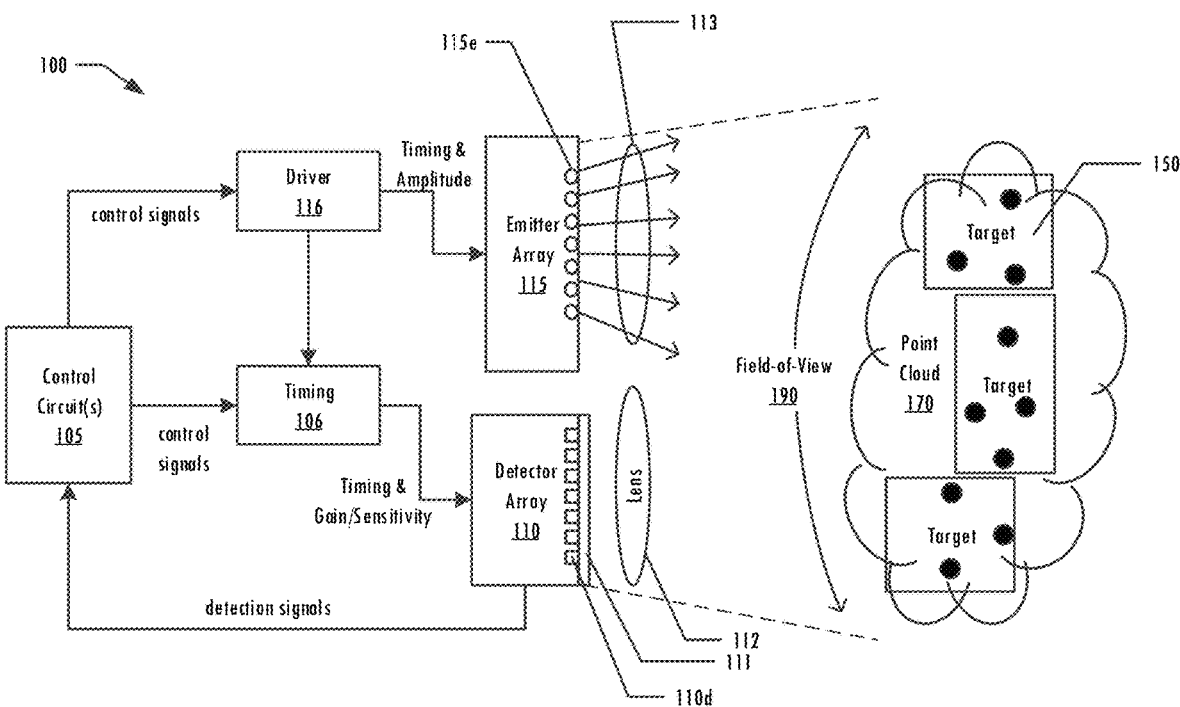
FIG. 1 is a schematic block diagram illustrating an example of a LIDAR system or circuit in accordance with embodiments of the present disclosure.

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A detector pixel may also include or provide outputs to dedicated circuits, such as storage and logic circuits, which are not shared with other pixels, referred to herein as an "in-pixel" configuration. A flash lidar system may acquire images by emitting light from an array of emitters, or a subset of the array, for short durations (pulses) over a FoV or scene, and detecting the echo signals reflected from one or more targets in the FoV at one or more detectors.

In embodiments described herein, a detection window or strobe window may refer to the respective durations of activation and deactivation of one or more detectors (e.g., responsive to respective detector time gates/control signals from a control circuit) over a temporal period or time between pulses of the emitter(s) (which may likewise be responsive to respective emitter control signals from a control circuit). The relative timings and durations of the respective detection windows may be controlled by respective strobe signals as described herein, in which case the detection windows may be referred to as strobe windows. Some embodiments may operate with strobe windows of longer time durations and corresponding farther distance subranges (e.g., with each strobe window corresponding to a 200 meter (m) distance subrange), or even as a single-strobe system whereby the full or overall imaging distance range (e.g., 400 m) is imaged or acquired at once (i.e., over a single strobe window; also referred to as single full range acquisition).

Some embodiments of the present disclosure are directed to lidar systems and related operating methods for acquiring lower angular-resolution 3D point cloud data with reduced power consumption. In the present disclosure, the signal-to-noise ratio (SNR) can be calculated as:

$$SNR_1 = \frac{s}{(s+n)^{1/2}}$$

where s is the signal (e.g., the optical signals emitted from a light source of the system, reflected from a target, and detected by an optical receiver) and n is the noise (e.g., optical signals detected by the optical receiver which were not emitted by the light source of the system).

An example of a lidar system or circuit 100 in accordance with embodiments of the present disclosure is shown in FIG. 1. The lidar system 100 includes a control circuit 105, a timing circuit 106, an emitter array 115 including a plurality of emitters 115e, and a detector array 110 including a plurality of detectors 110d. The detectors 110d include time-of-flight sensors (for example, an array of single-photon detectors, such as SPADs). One or more of the emitter elements 115e of the emitter array 115 may define emitter units that respectively emit a radiation pulse or continuous wave signal at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110d of the detector array 110. The control circuit 105 implements a pixel processor that measures and/or calculates the time of flight of the illumination pulse over the journey from emitter array 115 to target 150 and back to the detectors 110d of the detector array 110, using direct or indirect ToF measurement techniques.

Figure 3A:
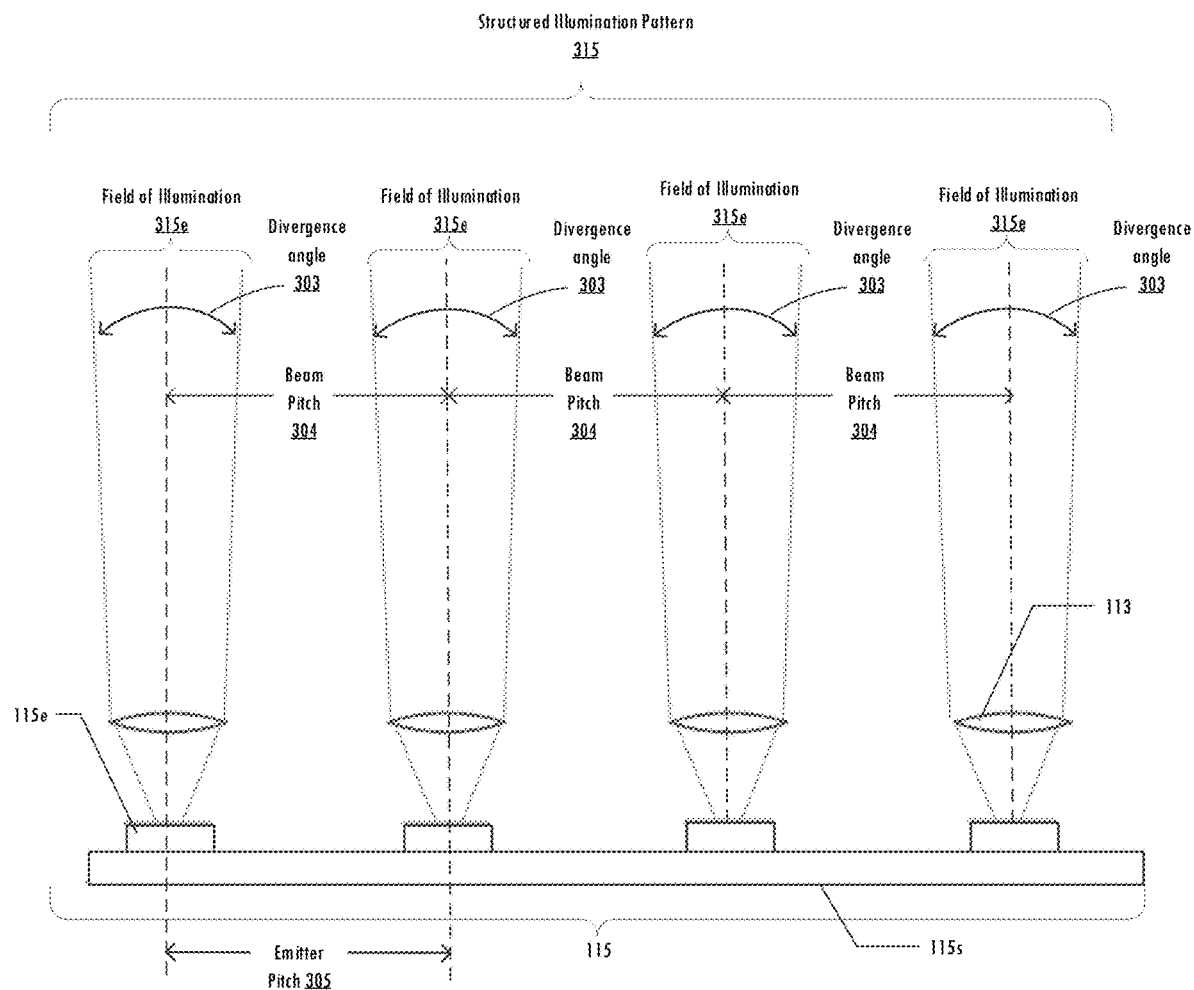
FIGS. 3A, 3B, and 3C are schematic diagrams illustrating respective fields of illumination of light beams output from an emitter array, in accordance with some embodiments of the present disclosure.

In some embodiments, as shown in greater detail in FIG. 3A, an emitter module or circuit 115 may include an array of emitter elements 115e (e.g., VCSELs), a corresponding array of optical elements 113 coupled to one or more of the emitter elements (e.g., lens(es) 113, such as microlenses), and/or driver electronics 116. The optical elements 113 may be configured to provide a sufficiently low beam divergence of the light output from the emitter elements 115e so as to ensure that fields of illumination of either individual or groups of emitter elements 115e do not significantly overlap (and in some embodiments described herein define a sparse illumination pattern 315), and yet provide a beam divergence of the light output from the emitter elements 115e to provide eye safety to observers. The optical elements 113 may not be included in some embodiments. The emitters 115e may be provided on a curved or flexible substrate 115s so as to contribute to the desired structured illumination pattern. The emitter module 115 may be configured to provide the desired structured illumination pattern without or free of a light diffuser element.

The driver electronics 116 may each correspond to one or more emitter elements, and may each be operated responsive to timing control signals with reference to a master clock and/or power control signals that control the peak power of the light output by the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing and amplitude of the optical emission signals that are output from the emitters 115e.

The emission of optical signals from multiple emitters 115e provides a single image frame for the flash LIDAR system 100. The maximum optical power output of the emitters 115e may be selected to generate a signal-to-noise ratio of the echo signal from the farthest, least reflective target at the brightest background illumination conditions that can be detected in accordance with embodiments described herein.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1.

In some embodiments, a receiver/detector module or circuit 110 includes an array of detector pixels (with each detector pixel including one or more detectors 110d, e.g., SPADs), receiver optics 112 (e.g., one or more lenses to collect light over the FoV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The receiver optics 112 may include a macro lens that is configured to collect light from the largest FoV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of "signal" light (i.e., light of wavelengths corresponding to those of the optical signals output from the emitters) but substantially reject or prevent passage of non-signal or background light (i.e., light of wavelengths different than the optical signals output from the emitters).

The detectors 110d of the detector array 110 are connected to the timing circuit 106. The timing circuit 106 may be phase-locked to the driver circuitry 116 of the emitter array 115. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity.

In some embodiments, a control circuit 105, such as a microcontroller or microprocessor, provides different emitter control signals to the driver circuitry 116 of different emitters 115e and/or provides different signals (e.g., strobe signals) to the timing circuitry 106 of different detectors 110d to enable/disable the different detectors 110d so as to detect the echo signal from the target 150. The control circuit 105 may also control memory storage operations for storing data indicated by the detection signals in a non-transitory memory or memory array 205.

"Strobing" as used herein may refer to the generation of detector control signals (also referred to herein as strobe signals or "strobes") to control the timing and/or duration of activation (detection or strobe windows) of one or more detectors 110d of the lidar system 100. That is, some embodiments described herein can utilize range strobing (i.e., biasing the SPADs to be activated and deactivated for durations or windows of time over the emitter cycle, at variable delays with respect to the firing of the emitter (e.g., a laser), thus capturing reflected signal photons corresponding to specific distance sub-ranges at each window/frame) to limit the number of ambient photons acquired in each emitter cycle. An emitter cycle (e.g., a laser cycle) refers to the time between emitter pulses. In some embodiments, the emitter cycle time is set as or otherwise based on the time required for an emitted pulse of light to travel round trip to the farthest allowed target and back, that is, based on a desired distance range.

A range-strobing flash lidar (e.g., with one or more strobe windows corresponding to respective distance ranges or sub-ranges, and with subframes collecting data based on the detection signals output during a respective strobe window) may use strobing for several reasons. For example, in some embodiments, detector elements may be combined into pixels and the detector elements and/or pixels may be selectively activated after the emission of optical signals to detect echo signals from a target during specific strobe windows. The detected echo signals may be used to generate a histogram of detected "counts" of photons incident on the detector from the echo signal. Examples of methods to detect a target distance based on histograms are discussed, for example, in U.S. Patent Application Publication No. 2019/0250257, entitled "Methods And Systems For High Resolution Long-Range Flash Lidar," the contents of which are incorporated herein by reference.

Figure 2:
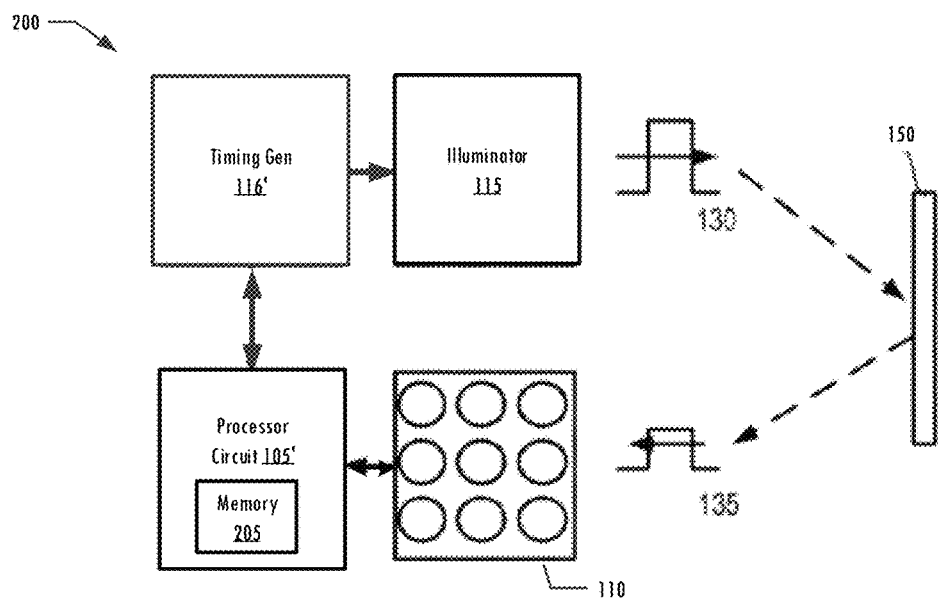
FIG. 2 is a schematic block diagram illustrating components of a ToF measurement system or circuit in a LIDAR application in accordance with some embodiments of the present disclosure.

FIG. 2 further illustrates components of a ToF measurement system or circuit 200 in a LIDAR application in accordance with some embodiments described herein. The circuit 200 may include a processor circuit 105' (such as a digital signal processor (DSP)), a timing generator 116' which controls timing of the illumination source (illustrated by way of example with reference to a laser emitter array 115), and an array of single-photon detectors (illustrated by way of example with reference to a single-photon detector array 110). The processor circuit 105' may also include a sequencer circuit that is configured to coordinate operation of the emitters 115e and detectors 110d.

The processor circuit 105' and the timing generator 116' may implement some of the operations of the control circuit 105 and the driver circuit 116 of FIG. 1. The laser emitter array 115 emits a laser pulse 130 at a time controlled by the timing generator 116'. Light 135 from the laser pulse 130 is reflected back from a target (illustrated by way of example as object 150), and is sensed by single-photon detector array 110. The processor circuit 105' implements a pixel processor that measures the ToF of the laser pulse 130 and its reflected signal 135 over the journey from emitter array 115 to object 150 and back to the single-photon detector array 110.

The processor circuit 105' may provide analog and/or digital implementations of logic circuits that provide the necessary timing signals (such as quenching and gating or strobe signals) to control operation of the single-photon detectors of the array 110 and process the detection signals output therefrom. For example, the single-photon detectors of the array 110 may generate detection signals in response to incident photons only during the short gating intervals or strobe windows that are defined by the strobe signals. Photons that are incident outside the strobe windows have no effect on the outputs of the single photon detectors. More generally, the processor circuit 105' may include one or more circuits that are configured to generate the respective detector control signals that control the timing and/or durations of activation of the detectors 110d, and/or to generate respective emitter control signals that control the output of optical signals from the emitters 115e. Detection events may be identified by the processor circuit 105' based on one or more photon counts indicated by the detection signals output from the detector array 110, which may be stored in the memory 205.

The field of view 190 of a lidar system may be referred to herein as including the respective fields of illumination of optical signal emission from the emitter, the fields of detection over which light is detected by the receiver or detector (also referred to as a detector field of view), and the intersection thereof. Conventionally, it may be desirable for the fields of illumination and the fields of detection/detector fields of view to overlap as much as possible.

Some embodiments of the present disclosure may arise from realization that some lidar systems may reduce or limit the number of SPADs that detect a return signal by utilizing an emitter array made up of vertical cavity surface emitting lasers (VCSELs) to generate a corresponding array of sparse beams (i.e., such that only a sparse array of reflections may impinge on the detector array). The emitter arrays of such lidar systems may be "sparse" in that the number of pulsed beams of optical radiation that are emitted toward a target scene is substantially less than the number of pixels in the detector array that receives the radiation reflected from the scene.

Figure 3B:
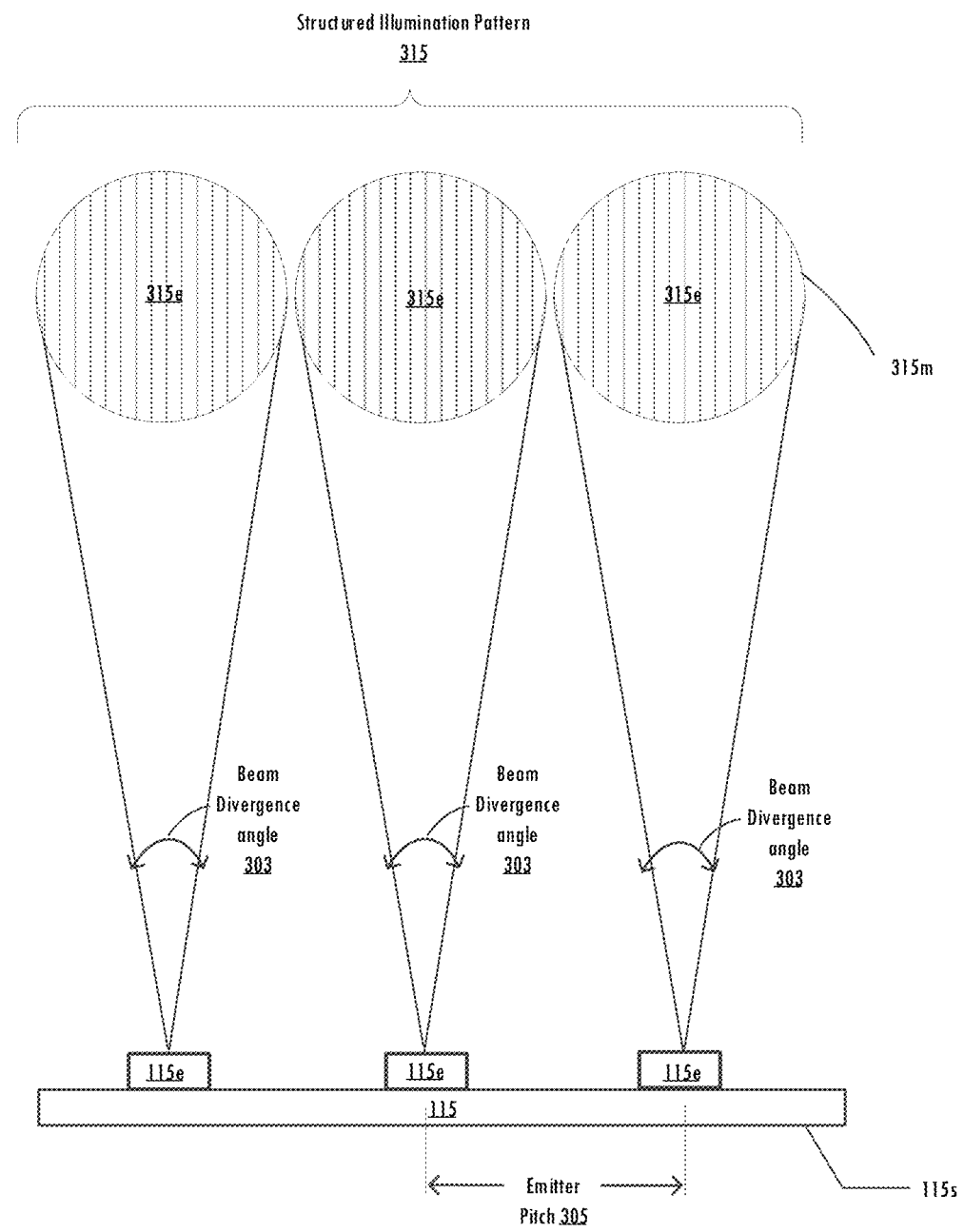
Figure 3C:
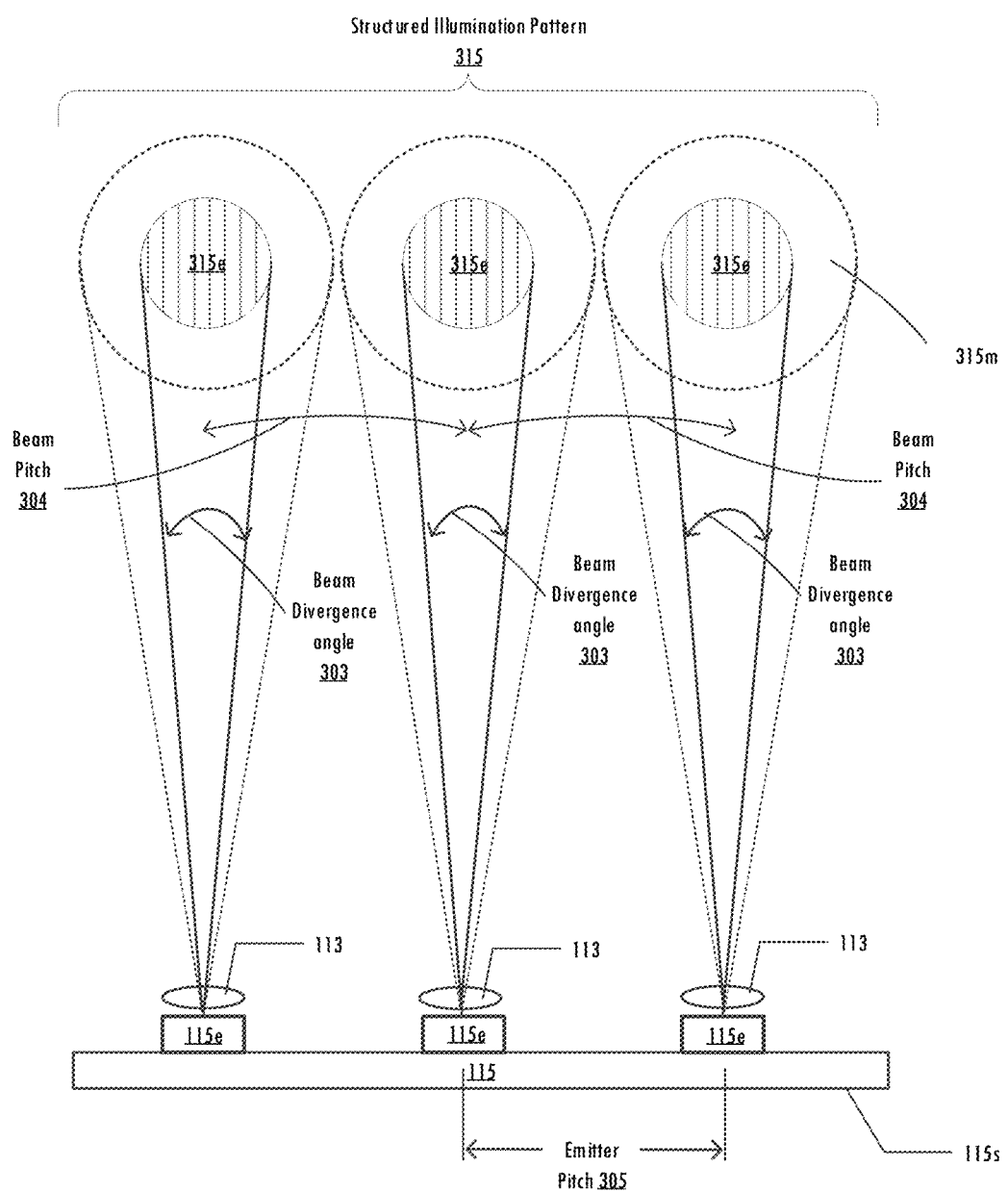

In some embodiments of the present disclosure, the light source (e.g., the emitter array 115) is configured to generate and emit beams of light, for example, a sparse array of pulsed light beams 315, with a relatively tight spectral distribution (e.g., having wavelengths that fall within ±1% of a desired wavelength or wavelength range) and a relatively narrow divergence angle, as shown by way of example in FIGS. 3A to 3C. As used herein, a sparse array of light beams output from an emitter array or other light source may refer to a pattern of structured illumination 315 in which the divergence angle 303 of each light beam is relatively small in comparison to the angular separation between adjacent light beams, also referred to herein with reference to the pitch 304 between the beams. For example, the sparse pattern of structured illumination 315 may include an array of light beams, each with a divergence angle 303 of less than about 0.5 degrees (for example, a divergence angle 303 of about 0.3 degrees, 0.2 degrees, or 0.1 degrees), a beam pitch 304 of less than about 5 degrees×5 degrees (e.g., a 3×3 degree beam pitch, a 2×2 degree beam pitch, or a 1×1 degree beam pitch), and a center wavelength in the infrared wavelength range (e.g. about 940 nm±1 nm) at a desired temperature (e.g., about 25 degrees Celsius). As used herein, the notation of "n×m degrees" may refer to horizontal (n) and vertical (m) angles of divergence.

The array of light beams 315 may be generated and emitted from an emitter array 115 including a plurality of emitter units 115e to define respective fields of illumination 315e (also referred to herein as an illumination spots 315e) of about 0.5×0.5 degrees or less (e.g., about 0.3×0.3 degrees, 0.2×0.2 degrees, or 0.1×0.1 degrees), while the emitter array 115 may be configured to illuminate a relatively large total field of view, for example a FoV of about 100 degrees (horizontal)×45 degrees (vertical) or more. The sparse array of light beams may thus be independent of the number of light beams emitted versus the number of detector pixels, and may also be referred herein as a sparse structured illumination pattern 315.

In some embodiments, the emitters 115e of the emitter array 115 may be arranged at a pitch 305 and may have divergence angles such that the respective (e.g., maximum) fields of illumination 315m illuminate the relatively large total field of view. For example, adjacent emitters 115e may be arranged with a pitch 305 (also referred to as an emitter pitch) of less than about 500 micrometers (µm), for example, about 300 µm). In some embodiments, the respective fields of illumination 315e may be equal to (as shown in FIG. 3B) or less than (as shown in FIG. 3C) the maximum fields of illumination 315m. For example, respective optical elements 113 (as shown in FIG. 3C) may be configured to direct the beams from the emitters 115e with respective smaller divergence angles 303 so as to define a sparse pattern of illumination 315 with a pitch 304 (also referred to as a beam pitch) between the respective fields of illumination 315e, and such that the respective fields of illumination 315e are smaller than the maximum fields of illumination 315m. An optical element such as a grating or a diffractive optical element (in addition or as an alternative to the optical elements 113) may be used to generate the sparse array of beams 315 from one or more beams. More generally, any combination of emitter pitch 305 and/or optical elements 113 may be used to define the sparse structured illumination patterns 315 described herein, also referred to as a sparse field or pattern of illumination.

A light receiver may include one or more optical elements that are configured to image approximately the same total field of view as that of the emitter array onto a detector array (e.g., an array of SPADs, or an array of photon-mixing devices for indirect time-of-flight measurement), similar to those described in U.S. Patent Application Publication No. 2019/0250257 to Finkelstein et al. entitled "Methods and Systems for High Resolution Long-Range Flash Lidar", the disclosure of which is incorporated by reference herein in its entirety.

The examples provided below are described primarily with reference to direct time of flight (dToF) systems, but it will be understood that embodiments described herein can be utilized with any actively-illuminated lidar system, including indirect time of flight (iToF) systems.

Embodiments of the present disclosure provide lidar systems including emitter units and detector pixels in which the respective fields of illumination 315e of the emitter units 115e (including the divergence angle 303 and pitch 304 of the beams of light emitted therefrom) are relatively sparse (e.g., less than about one-half, less than about one-third, or less than about one-fifth of) in comparison to the respective fields of detection 410d of the detector pixels 110d. The sparse field of illumination 315 is thus relative to the field of detection 410d per detector pixel 110d, rather than the number of detector pixels 110d. In some embodiments, the field of detection 410d per detector pixel is at least the size of the solid angle illuminated by a single beam of light output from a respective emitter unit (i.e., the divergence angle 303 or field of illumination 315e of each emitter unit 115e), but is smaller than the pitch 304 of the beams of light output from the emitter array 115. For example, the detector pixels 110d may be implemented by a SPAD array including more than 250×100 detector pixels (e.g., 500×225 detector pixels), each with a field of detection 410d of less than about 1×1 degrees (e.g., about 0.5×0.5 degrees, 0.3×0.3 degrees, or 0.2×0.2 degrees). The field of detection 410d per detector pixel 110d may be relatively large as compared to the respective fields of illumination 315e of each light beam of the sparse array of light beams 315.

Figure 4:
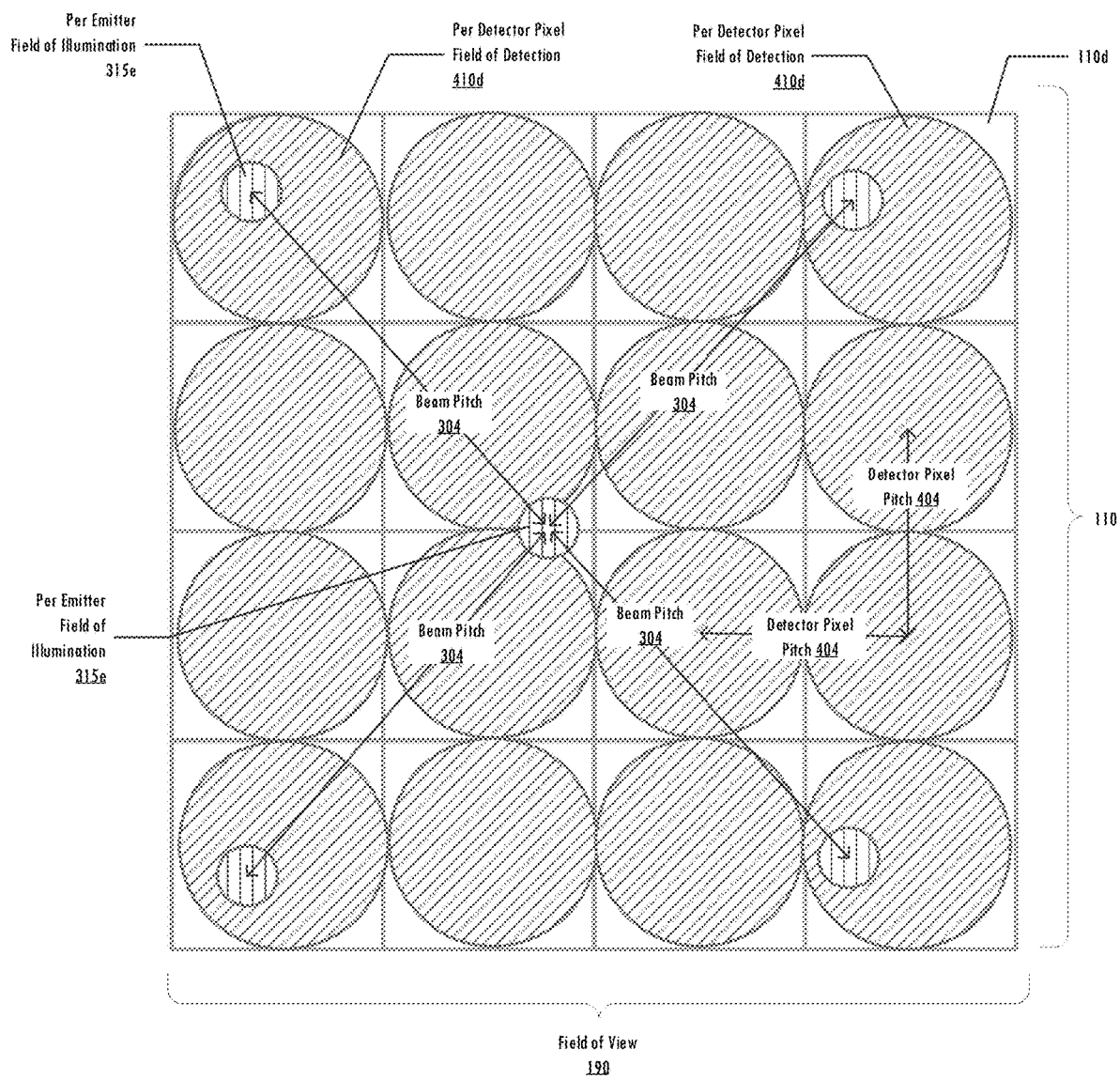
FIG. 4 is a schematic plan view illustrating respective fields of detection of detector pixels of a detector array in comparison to respective fields of illumination of light beams output from an emitter array, in accordance with some embodiments of the present disclosure.

FIG. 4 is a schematic plan view illustrating an example detector array 110 in accordance with some embodiments of the present disclosure. As shown in FIG. 4, a detector array 110 may include a plurality of detector pixels 110d with a pitch 404 between adjacent detector pixels 110d, with each detector pixel 110d having a respective field of detection 410d. The respective fields of detection 410d (or detector pixel pitch 404) may be greater than the respective fields of illumination 315e (or beam divergence angle 303) per emitter 115e of the structured illumination pattern 315, with the respective fields of detection 410d being smaller than the pitch 304 between respective beams defining the fields of illumination 315e, or the pitch 305 between adjacent emitters 115e.

During operation, all of the detector pixels 110d are functional, i.e., there are no super-pixels whereby sensing elements or respective pixels are selectively actuated only when their detection signals provide or are expected to provide useful information. One or more memory arrays (such as the memory array 500 of FIG. 5) may be configured to store a histogram of data based on the respective detection signals output from the plurality of detector pixels 110d of the detector array, rather than from only a small subset of the detector pixels 110d. Histogramming may include grouping counts of arriving photons within "bins" of time based on their time of arrival. For example, a histogram data repository may be generated including respective bins associated with durations or "windows" of time. Related operations for histogram generation and related memory configurations are described, for example, U.S. Patent Application Publication Nos. 2020/0233068, 2021/0215807, and 2021/0231782 to Henderson et al., and U.S. patent application Ser. No. 17/391,864 to Caporale et al., the disclosures of which are incorporated by reference herein in their entireties.

In some embodiments, each detector pixel 110d may contain or otherwise correspond to a respective memory array (either on the same die or in a corresponding electrically-interconnected die), such that the detection signals output from each detector pixel 110d may be directed to the respective memory array. The memory array may be divided into time bins, e.g., where each time bin corresponds to a respective memory bank of the memory array.

For example, the array 110 of detector pixels 110d may be operated simultaneously, with the respective detection signals from each detector pixel 110d used to store data for (i.e., "build") a per-pixel histogram. A detector pixel 110d may include one or more SPADs, with the SPAD(s) of that detector pixel 110d outputting detection signals with data for its respective histogram. The detector pixel field of detection 410d (or detector pixel pitch 404) may be greater than the emitter light beam or spot divergence angle 303, but may be less than the pitch 304 between emitter light beams (or emitter pitch 305), such that a field of illumination/illumination spot 315e is more likely to fall within the field of detection 410d of a detector pixel 110d. Since the pixels 110d of the detector array 110 are operated or active simultaneously, embodiments of the present disclosure may operate without searching for or otherwise determining which detector pixel(s) 110d detected the return signals and/or without routing detection signals from an identified subset of the detector pixels 110d to histogramming resources, e.g., on the edge of the array 110. That is, the control circuit 105 or processing circuit 105' may process the respective detection signals output from up to all of the detector pixels 110d of the array 110 (rather than selectively processing detection signals from identified ones of the pixels 110d) to determine the respective arrival times of photons corresponding to the light beams 315.

In some embodiments, in post processing, it may be determined which detector pixels 110d detected signal photons and which detector pixels 110d pixels detected background photons. For example, it may be determined where the spots or respective fields of illumination 315e are detected (i.e., where the spots 315e "fall") in the fixed system or detector array 110, and the subset of the detector pixels 110d identified as detecting only background photons may be deactivated in order to save power. A calibration routine may be used to track which detector pixels 110d have detected signal photons (i.e., to identify the pixels 110d onto which the spots 315e fall) and can be performed as needed in case the system 100 experiences mechanical/thermal shifts or other changes in environmental or operating conditions.

Figure 5:
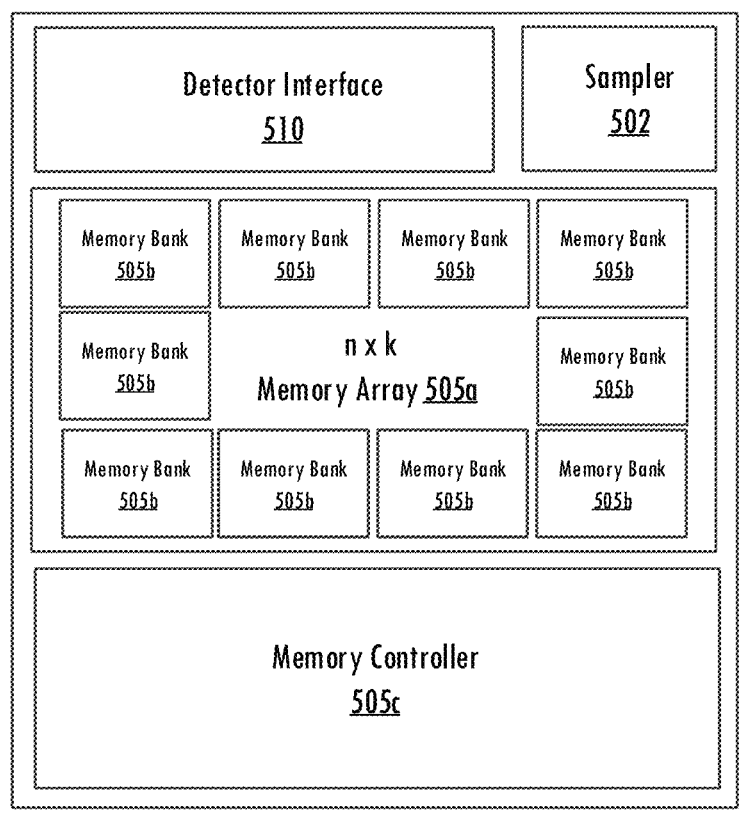
FIG. 5 is a schematic block diagram illustrating an example configuration of a memory array in accordance with some embodiments of the present disclosure.

FIG. 5 is a schematic block diagram illustrating an example configuration of a memory array in accordance with some embodiments of the present disclosure. As shown in FIG. 5, an array-element memory 500 ("memory array") is configured to store photon information for one or more detector pixels. The photon information may be stored in the memory 500 in a histogram format, with data indicating counts of detected photons stored in respective memory banks 505b (also referred to herein as memory bins) corresponding to histogram time bins, which indicate respective times-of-arrival of the detected photons. In the example of FIG. 5, a memory 500 includes a photodetector interface circuit 510 configured to receive detection signals from one or more photodetectors (e.g., SPADs), a sampler circuit 502 configured to sample the detection signals output from the photodetectors 110d, a main memory device 505a including a plurality of memory banks 505b (e.g., providing n bins and k bits per bin) configured to store histogram data, and a memory controller circuit 505c that is configured to manage operations of the interface circuit 510, the sampler 502, and the main memory device 505a to store and integrate data indicated by the detection signals output from the photodetectors into the histogram data.

In particular, the memory control circuit(s) 505c is/are configured to determine which memory bank 505b is to be incremented if a detection event (e.g., an avalanche in response to an incident photon) is detected. Specifically, during each bin time (e.g., the time duration within a detection window or strobe window that is represented by a particular histogram bin), a respective memory bank 505b may be incremented in response to a detected avalanche. That is, the avalanche events may be sampled (e.g., periodically) and saved in different bins (e.g., bin #1 to bin #n). The bins may be physically separate areas of the detector pixel memory. For example, the detection signals output from the detector and/or detector pixel (which may indicate the counting of avalanche events per time bin) may be directed to different memory banks 505b corresponding to different distance sub-ranges, such that photons that are detected at different delays relative to the emitter pulse are respectively stored in different memory locations 505b. The storage locations 505b may be swapped and/or iterated (e.g., through the use of multiplexer and/or other type of memory pointer to enable different memory banks 505b at different times) to change the location at which the avalanche counts are stored based on a time delay and/or duration since the emission of the emitter pulse. Such operations are described in greater detail in U.S. Patent Application Publication No. 2021/0109224 to Finkelstein et al. entitled "Strobing Flash Lidar with Full Frame Utilization", the disclosure of which is incorporated by reference herein in its entirety.

At the end of an imaging frame (or subframe) of M light beam pulses (for example, where the imaging frame or subframe may include hundreds or thousands of light beam pulses M, e.g., where M=1000, 2000, or 5000), the contents of the respective memory array 505a from multiple or all of the detector pixels 110d (rather than from only those detector pixels identified as having detected photons) is read out, e.g., using a rolling shutter or rolling readout scheme (where one memory bank or bin is read out at a time, row-by-row or column-by-column). The readout signals may represent a histogram of data (e.g., detected photon counts) collected by the respective detector pixels over the imaging frame or subframe.

The control circuit(s) may include processing circuitry and/or software that is configured to determine whether a signal peak (e.g., a peak histogram bin that contains a highest count of the plurality of histogram bins) exists in the per-pixel histogram and if so, its timing signature. That is, after or responsive to the output of the readout signals representing the detected photon counts, embodiments of the present disclosure may perform further processing to identify the presence and timing of detection events corresponding to signal photons. For example, based on recognition that photons from a pulsed laser and reflected by a target may arrive in a relatively narrow window of time, embodiments described herein can identify detection events corresponding to these time-correlated photons (i.e., the signal photons) while rejecting or disregarding detection events corresponding to uncorrelated photons from ambient light sources (also referred to herein as background photons), to provide in-pixel averaging without performing time-to-digital conversion of the respective times of arrival.

That is, while some conventional lidar systems may include TDC that translate the detection signals from a SPAR pixel to time-of-arrival information, embodiments of the present invention may store the detection signals output from a plurality of or all detector pixels 110d as respective time-of-arrival histograms, and may perform a readout of the plurality of memory banks 505b without first identifying which detector pixels received signal photons and then determining times-of-arrival only for the identified detector pixels, via TDCs. In some embodiments, a center of mass calculation may be performed (e.g., by averaging a sum of the number of detection events at or as of each timing interval or window, rather than averaging the times of arrivals), which can be used to estimate the time of flight to (and thus, distance of) a target. In some embodiments, the resolution of the time measurement stored in the per-pixel histogram is equal to the bin width. In some embodiments, the resolution of the time measurement stored in the per-pixel histogram is smaller than the bin width and is determined, for example, by interpolation or fitting. For example, the control circuit(s) may interpolate the position of the histogram peak from grossly sampled or "coarse" histogram bins, providing an improved temporal resolution relative to the bin width. Related processing operations are described in greater detail in U.S. Patent Application Publication No. 2020/0158836 to Henderson et al. entitled "Digital Pixel" and U.S. Patent Application Publication No. 2020/0233068 to Henderson et al. entitled "Digital Pixels and Operating Methods Thereof", the disclosures of which are incorporated by reference herein in their entireties. A 3D point cloud can be calculated based only on detection events from the subset of detector pixels indicating a detected correlated signal.

Embodiments of the present disclosure may provide for significant reduction in optical power emission as compared to some traditional schemes (e.g., where the respective fields of illumination and the respective fields of detection may more closely or completely overlap). In particular, the noise n in the system can be calculated as:

$$n = \frac{\alpha \omega A_l \tau B}{\pi \epsilon},$$

where E is the total light energy per pulse, τ is the pulse duration, a is the photon detection fraction, Ω is the total field of view, ω is the pixel field of view, $A_l$ is the lens area, ε is the photon energy, and B is the non-correlated photon flux (number of photons per unit area per unit time). Thus, if the field of view 190 is illuminated by respective beams as shown in FIGS. 3 and 4, the emitter power can be reduced by $$\sqrt{\frac{\omega_p}{\omega_i}},$$

where $\omega_p$ is the pitch of the emitter beams and where $\omega_i$ is the solid angle imaged by a detector pixel 110d (i.e., the respective field of detection). This ratio (of the pitch of the emitter beams to the field of detection per pixel) may be an integer. In some embodiments, this ratio may be a 5 degree pitch/1 degree field of detection per pixel=5, so such a system may consume approximately $\frac{1}{5}^{th}$ the power of a system with a similar resolution whereby the entire field of view is illuminated (that is, where the field of illumination per emitter unit more closely corresponds to the field of detection per detector pixel).

In some embodiments, calibration may not be required between the respective fields of illumination 315e of the emitter units (i.e., the "cones" of light defined by the emitter output 315) and the respective fields of detection 410d of the detector pixels, other than an approximate overall field of illumination of the emitter array versus field of view/detection of the detector array alignment.

In some embodiments, the returned echo signals may impinge on multiple (e.g., two, three, or four) detector pixels 110d, in which case the SNR will be reduced. As such, in some embodiments, the emitter array 115 may include one or more collimating optical elements and/or may otherwise be configured to collimate the respective beams of light output from the emitter units 115e, so as to reduce the percentage of multiple detector acquisitions. In some embodiments, the processing circuit 105' may be configured to identify the existence of detection events with a similar time stamp on adjacent detector pixels 110d, and map or otherwise correlate the detection events to a single or respective returned echo signal by summing the outputs of those detector pixels 110d.

In some embodiments, formation of the sparse emission array (e.g., a 2D structured illumination pattern 315) may be implemented using emitter pitch and/or one or more optical elements 113, such as lenses, gratings, diffractive optical elements, and/or other devices as are known in the art.

In some embodiments, the spot size 315e (or divergence angle 303) may be greater than the detector pixel pitch 404 or per detector pixel field of detection 410d. The detection signals output from the detector pixels 110d may be processed in parallel to determine the detector pixels 110d onto which the illumination spots 315e have fallen (e.g., the subset of the detector pixels 110d that detected a respective illumination spots 315e may be determined), and in-pixel binning or external binning may be performed in post processing to combine individual histograms representing detection of signal photons for storage in respective time-of-arrival histograms, without performing one or more time-to-digital conversion operations.

Embodiments of the present disclosure have been described herein with reference to light-based ranging measurement systems (such as lidar) and related methods of operation that are configured to reduce the quantity of incoming photons that are measured and/or stored as data in memory. Processing circuits as described herein may be configured to calculate an estimated time of arrival of the burst of photons based on a ratio of the time-integrated number of detection events (e.g., as provided by time accumulator circuits herein) and the count of the detection events (e.g., as provided by photon counter circuits herein) of the photons by respective detectors in the array. Some embodiments may include a Center of Mass Method (CMM) computation circuit configured to calculate an estimated time of arrival of photons incident on the plurality of detectors by performing a center of mass calculation on a subset of the plurality of coarse histogram bins. The subset of the plurality of coarse histogram bins may include a peak histogram bin containing a highest count of the plurality of coarse histogram bins.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al., filed Apr. 12, 2018, with the United States Patent and Trademark Office, the disclosure of which is incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts.

The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the present invention being set forth in the following claims.

That which is claimed:

1. A flash Light Detection and Ranging (LIDAR) system, comprising:
   an emitter array comprising a plurality of emitters configured to generate and emit an array of beams of light forming a sparse pattern of structured illumination in which each of the beams has a respective divergence angle over a respective field of illumination; and
   a detector array comprising plurality of detector pixels having respective fields of detection and configured to output respective detection signals responsive to light incident thereon,
   wherein the respective fields of illumination of the beams of light are less than about one half in number in comparison to the respective fields of detection of the detector pixels and the fields of detection are greater than or equal to the respective divergence angles of the light beams.

2. The LIDAR system of claim 1, wherein the respective fields of illumination define a structured illumination pattern having a predetermined pitch between adjacent ones of the light beams, and wherein the respective fields of detection are less than the predetermined pitch.

3. The LIDAR system of claim 2, wherein the respective divergence angles of the light beams are less than the predetermined pitch between adjacent ones of the light beams.

4. The LIDAR system of claim 1, wherein the respective fields of illumination define a sparse pattern of illumination that is less than about one-third of the respective fields of detection of the detector pixels.

5. The LIDAR system of claim 1, wherein the respective fields of detection of the detector pixels are less than about 1 degree by 1 degree, the respective divergence angles are less than about 0.5 degrees by 0.5 degrees, and a predetermined pitch between adjacent ones of the light beams is less than about 5 degrees by 5 degrees.

6. The LIDAR system of claim 5, wherein the respective fields of detection of the detector pixels are about 0.5 degrees by 0.5 degrees, the respective divergence angles are about 0.1 degrees by 0.1 degrees, and the predetermined pitch between adjacent ones of the light beams is about 1 degree by 1 degree.

7. The LIDAR system of claim 1, wherein the respective detection signals indicate detection of photons corresponding to the light beams and/or ambient light, and further comprising:
   at least one control circuit configured to process the respective detection signals output from the plurality of the detector pixels to determine respective arrival times of the photons corresponding to the light beams.

8. The LIDAR system of claim 7, wherein the at least one control circuit is configured to determine the respective arrival times without performing one or more time- to-digital conversion operations.

9. The LIDAR system of claim 7, further comprising:
   a memory device comprising a non-transitory storage medium configured to store data in respective memory bins corresponding to respective times-of-arrival,
   wherein the at least one control circuit is configured to update the data in the respective memory bins responsive to the respective detection signals from the plurality of the detector pixels.

10. The LIDAR system of claim 9, wherein the at least one control circuit is configured to update the data in the respective memory bins of respective memory arrays corresponding to respective ones of the detector pixels, and determine the respective arrival times based on readout signals from the respective memory arrays.

11. The LIDAR system of claim 10, wherein the readout signals from the respective memory arrays represent respective histograms of the data collected by the respective ones of the detector pixels, and the at least one control circuit is configured to detect peaks in the respective histograms to determine the respective arrival times of the photons corresponding to the light beams.

12. The LIDAR system of claim 10, wherein the at least one control circuit is configured to determine respective arrival times of the photons corresponding to the light beams based on a time correlation indicated by the readout signals.

13. The LIDAR system of claim 1, wherein the light source comprises one or more vertical cavity surface emitting lasers (VCSELs).

14. The LIDAR system of claim 1, wherein the detector pixels respectively comprise one or more single photon avalanche diodes (SPADs).

15. The LIDAR system of claim 1, wherein the LIDAR system is configured to be coupled to an autonomous vehicle such that the light source and the detector array are oriented to face an intended direction of travel of the autonomous vehicle.

16. A method of fabricating a Light Detection and Ranging (LIDAR) system, the method comprising:
providing a light source configured to emit a plurality of light beams forming a sparse pattern of structured illumination in which each of the beams has a respective divergence angle over a respective fields of illumination; and
providing a detector array comprising plurality of detector pixels having respective fields of detection and configured to output respective detection signals responsive to light incident thereon,
wherein the respective fields of illumination of the beams of light are less than about one half in number in comparison to the respective fields of detection of the detector pixels and the fields of detection are greater than or equal to the respective divergence angles of the light beams.

17. The method of claim 16, wherein the respective fields of illumination define a structured illumination pattern having a predetermined pitch between adjacent ones of the light beams, and wherein the respective fields of detection are less than the predetermined pitch.

18. The method of claim 17, wherein the respective divergence angles of the light beams are less than the predetermined pitch between adjacent ones of the light beams.

19. The method of claim 16, wherein the respective fields of illumination define a sparse pattern of illumination that is less than about one-third of the respective fields of detection of the detector pixels.

20. The method of claim 16, wherein the respective detection signals indicate detection of photons corresponding to the light beams and/or ambient light, and further comprising:
providing at least one control circuit configured to process the respective detection signals output from the plurality of the detector pixels to determine respective arrival times of the photons corresponding to the light beams.

* * * * *